Figure 1:
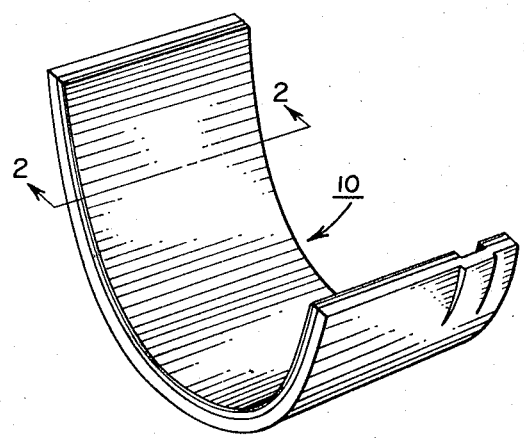

United States Patent
Selker et al.

[15] 3,644,105
[45] Feb. 22, 1972

[54] MULTILAYER BEARING

[72] Inventors: Milton L. Selker, Shaker Heights; Betty L. Berdan; Betty M. Luce, both of Willowick, all of Ohio

[73] Assignee: Clevite Corporation

[22] Filed: Mar. 3, 1970

[21] Appl. No.: 16,112

[52] U.S. Cl. ...................................................29/196.3
[51] Int. Cl. ..................................................B32b 15/00
[58] Field of Search...........................................29/196.3

[56] References Cited

UNITED STATES PATENTS

| | | | |
|---|---|---|---|
| 2,289,658 | 7/1942 | Koehring | 29/196.3 |
| 2,386,951 | 10/1945 | Howe | 29/196.3 |
| 2,459,172 | 1/1949 | Luetkemeyer | 29/196.3 |
| 2,465,329 | 3/1949 | Murray | 29/196.3 |
| 2,994,654 | 8/1961 | Fahnoe | 29/195 R |
| 3,403,010 | 9/1968 | McDonald | 29/196.3 |

Primary Examiner—Hyland Bizot
Attorney—Eber J. Hyde

[57] ABSTRACT

There is provided a multilayer bearing and method of forming same, said bearing characterized by its resistance to seizure under high-load conditions, said bearing comprising a steel backing member, an electrodeposited intermediate composite layer consisting of copper and molybdenum disulfide and an overlay of lead-tin alloy.

4 Claims, 3 Drawing Figures

PATENTED FEB 22 1972　　　　　　　　3,644,105

INVENTORS
MILTON L. SELKER
BETTY L. BERDAN
BY   BETTY M. LUCE

Eber J. Hyde
ATTORNEY

MULTILAYER BEARING

The present invention relates to a novel bearing for use in medium and heavy-duty applications where high-load conditions are encountered. More specifically, the bearing contemplated by the invention is characterized by a novel intermediate layer consisting of copper and molybdenum disulfide.

To be acceptable for use in diesel and gasoline engines, the bearing must be resistant to fatigue and seizure under high-load conditions, in addition to being inexpensive. In bearings of this type it is generally required to provide a surface layer or overlay which has a high lead-tin content in order to inhibit corrosion and aid in permitting the bearing surface to adjust to misalignment and shaft surface conditions. As to fatigue resistance, it has been customary to provide an intermediate layer of copper or leaded-bronze alloys. While such intermediate layers have shown good fatigue resistance, they suffer from their tendency to seize under high-load conditions.

The bearing in accordance with the present invention avoids the above-mentioned disadvantages by providing an intermediate composite layer which is resistant to seizure as well as fatigue.

As stated hereinabove, bearings having an intermediate layer of copper show good fatigue resistance but have a tendency to seize during operation at high loads. In order to substantially reduce, if not eliminate, this seizure tendency the invention takes advantage of the lubricating properties of molybdenum disulfide by incorporating it in particulate form in the copper matrix. Use of molybdenum disulfide as a lubricant is well known. In powder for, it has been used in dry film lubrication where it is bonded to specially prepared surfaces by resins, syrups or glues, and also as an additive to lubricating oils and greases.

Incorporating a powder in a metal matrix to form a composite material may be accomplished by sintering or electroplating processes. In the case of a copper-molybdenum disulfide composite for use as an intermediate layer in bearings, the sintering process is not practical due to reaction of the molybdenum disulfide with the copper. Thus, to codeposit a composite layer of copper and molybdenum disulfide would present a distinct advantage since the adverse reaction is eliminated and the thickness and the surface conditions are such that the need for machining the surface would be eliminated. In the prior art apparatus and method for forming a composite material consisting of a particulate additive in a metal matrix have been proposed—see U.S. Letters Pat. Nos. 3,061,525 and 3,168,457 to A. E. Grazen. One of the possible particulate additives suggested by Grazen in U.S. Pat. No. 3,061,525 is molybdenum disulfide. The method described in said patent is, however, impractical for the manufacture of bearing materials, as will be hereinafter shown.

It is therefore a primary object of the present invention to provide a multilayer bearing having improved seizure and fatigue resistance for use in high load applications.

Another object is to provide a method for forming composite materials by electrodeposition.

Still another object of the invention is to provide an improved method for forming a composite material suitable for bearings.

A further object is to provide an improved trimetal bearing which is inexpensive and yet suitable for use under high-load conditions.

Figure 2:
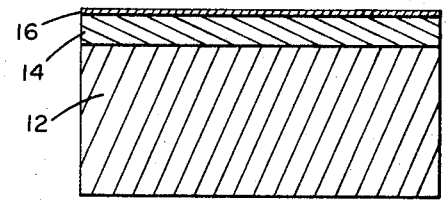
Figure 3:
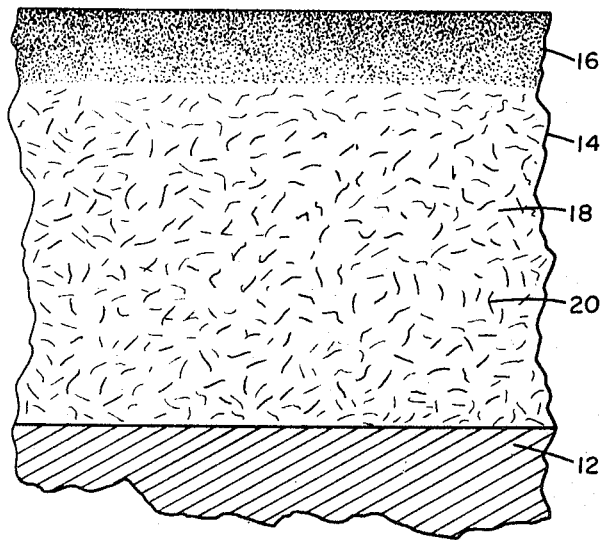

Other objects and advantages will become more apparent from the following description taken in conjunction with the accompanying drawings, in which:

FIG. 1 represents a perspective view of a bearing made in accordance with the invention, and FIG. 2 is a cross section of the bearing of FIG. 1 taken along the line 2—2, and FIG. 3 is a greatly enlarged cross-sectional view of the intermediate composite and surface layers.

To illustrate the structure and multilayer aspects of the bearing 10 shown in FIG. 1 reference is made to the cross-sectional view depicted in FIG. 2 in which the reference numeral 12 refers to a steel backing member made of conventional steel which is precision plated with an intermediate composite layer 14. The intermediate layer has a thickness between 0.001 to 0.004 inch and consists substantially of copper which contains 1–3 percent by weight of molybdenum disulfide. The thickness is selected in accordance with the anticipated application for the particular bearing. Layer 16 represents the surface layer composed generally of tin-lead alloy and is usually electrodeposited on the intermediate layer 14 to a thickness of about 0.0005 inch. The function of the surface layer is to provide the bearing with improved surface characteristics and allow adjustment to misalignment. Preferably the surface layer is composed of 8–10 percent tin, 1–3 percent copper, and the remainder, lead.

Referring to FIG. 3, there is shown an enlarged cross-sectional view of intermediate composite layer 14 consisting of matrix of copper 18 containing small, uniformly dispersed particles of molybdenum disulfide 20.

Bearings made in accordance with the invention have shown excellent resistance to seizure and fatigue under high-load conditions. The following example is provided to illustrate the advantages hereinabove described. It will be appreciated that the example below is for illustrative purposes and not intended to be limiting of the scope of the invention as set forth in the appended claims.

EXAMPLE I

To an acid copper plating solution contained in a plating tank there is added molybdenum disulfide to about 10 wt. percent of the copper. The bath composition and operating conditions are as follows:

| | |
|---|---|
| $CuSO_4 \cdot H_2O$ | 200 g./l. |
| $H_2SO_4$ | 80 g./l. |
| Chloride as HCl | 0.025 g./l. |
| Temperature | 50–55° C. |
| Current density | 100 a. per sq. ft. (a.s.f.) |
| Conc. of $MoS_2$ | 5 g./l. |

The cathode comprises the steel shells serving as backing members of the bearings.

The size of molybdenum disulfide particles ranges from 2 to 10 microns but preferably the particles be less than 5 microns. In this example 80 percent of the particles were less than 5 microns in size. Prior to and during codeposition of the copper and the molybdenum disulfide the plating solution was agitated vigorously. In fact, turbulent mass flow, such as rapid circulation of the electrolyte and the particles, is necessary to allow use of high current densities, the importance of which is facility of mass production and cost.

The steel shells are plated to the extent that the thickness of the composite is between 0.001–0.004 inch. The composite layer is smooth and fine grained in appearance.

The plated bearing shells are then rinsed clean with water and again placed in a plating bath to deposit thereon a protective surface layer of tin lead alloy (8–10 percent tin, 1–3 percent copper, and the balance, lead) the thickness being about 0.0005 inch.

The method described in the above example differs from that described in U.S. Pat. No. 3,061,525 in that codeposition of molybdenum disulfide is not effected by settling out. Experience has shown that it is necessary to utilize high agitation to assure uniformity of the dispersed phase of molybdenum disulfide.

The amount of molybdenum disulfide codeposited with the copper depends on its concentration in the bath, and on the current density. For example, at current densities of 100 amperes per square foot, the rate of codeposition increases with concentration up to about 12 percent by weight of the copper. Higher concentrations of molybdenum disulfide in the plating solution do not increase appreciably the amount codeposited with copper. In fact, concentrations of 20 percent by weight tend to give deposits that are darker in color and have rougher surfaces than those obtained with lower concentrations. Table I shows the effect of molybdenum disulfide concentrations in plating baths having the same composition described in Example I and operating at a current density of 100 a.s.f. The content of molybdenum disulfide in the composite layer was determined by known chemical methods.

TABLE I

| Conc. of MoS$_2$ g./l. | % by wt. MoS$_2$ in composite | Quality of composite layer |
| --- | --- | --- |
| 1 | 0.26 | Smooth, fine grained |
| 2 | 0.54 | Smooth, fine grained |
| 5 | 1.1 | Smooth, fine grained |
| 10 | 1.4 | Dark in color, random nodular roughness |

It has been found that current densities appear to have significant and marked effects on the amounts of molybdenum disulfide codeposited with copper. Table II shows these effects as related to the weight percent of MoS$_2$ in the composite layer deposited from a plating bath having the same composition described in Example I.

TABLE II

| Current Density a.s.f. | % by wt. MoS$_2$ in composite | Quality of composite layer |
| --- | --- | --- |
| 30 | 0.13 | grey-pink, smooth matte |
| 60 | 0.54 | grey-pink, smooth, slightly crystalline |
| 100 | 1.1 | grey-pink, smooth, slightly crystalline |
| 200 | 1.7 | grey-pink, smooth, crystalline |
| 250 | 2.7 | grey-pink, smooth, glossy crystalline |

Tests performed on a bearing having the composite layer described above withstood 200 hours of operation at 10,000 p.s.i. with minimum weight and wall losses.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall with the true spirit and scope of the invention.

What is claimed is:

1. A multilayer bearing having improved fatigue and seizure resistance comprising: a steel backing coated with an intermediate composite layer consisting essentially of copper and molybdenum disulfide, and an overlay of lead alloy.

2. A bearing as described in claim 1 wherein said intermediate composite layer is electrodeposited on said steel backing and has a thickness ranging between 0.001 and to 0.004 inch.

3. A bearing as described in claim 1 wherein said overlay consists of 8–12 percent tin, 1–3 percent copper, and the balance substantially lead and has a thickness of approximately 0.0005 inch.

4. A bearing as described in claim 1 wherein molybdenum disulfide comprises 1–3 percent by weight of the intermediate composite layer.

* * * * *